United States Patent [19]

Chmela et al.

[11] Patent Number: 4,771,748
[45] Date of Patent: Sep. 20, 1988

[54] SPARK-IGNITION, AIR-COMPRESSING, INTERNAL COMBUSTION ENGINE

[75] Inventors: Franz Chmela, Vienna, Austria; Walter Herzog, Katzwang; Richard Meier, Stein, both of Fed. Rep. of Germany

[73] Assignee: MAN Nutzfahrzeuge GmbH, Munich, Fed. Rep. of Germany

[21] Appl. No.: 101,226

[22] Filed: Sep. 25, 1987

[30] Foreign Application Priority Data

Sep. 25, 1986 [DE] Fed. Rep. of Germany ....... 3632579

[51] Int. Cl.[4] ................................................ F02B 3/00
[52] U.S. Cl. .................................... 123/276; 123/281; 123/282
[58] Field of Search ............... 123/276, 279, 281, 282, 123/285

[56] References Cited

U.S. PATENT DOCUMENTS

| | | | |
|---|---|---|---|
| 3,020,898 | 2/1962 | Hartmann | 123/282 |
| 3,140,697 | 7/1964 | Péras | 123/285 |
| 3,244,159 | 4/1966 | Mourer | 123/281 |
| 3,315,650 | 4/1967 | Bishop et al. | 123/279 |
| 3,814,066 | 6/1974 | Löhr | 123/281 |
| 3,872,841 | 3/1975 | Kimbara et al. | 123/285 |
| 4,083,330 | 4/1978 | Morris | 123/282 |
| 4,207,843 | 6/1980 | List et al. | 123/282 |
| 4,278,057 | 7/1981 | Urlaub et al. | 123/276 |
| 4,392,465 | 7/1983 | Wolters et al. | 123/282 |
| 4,473,046 | 9/1984 | Aoyama et al. | 123/285 |
| 4,492,194 | 1/1985 | Chonela et al. | 123/276 |
| 4,501,239 | 2/1985 | Bauer et al. | 123/276 |

Primary Examiner—Raymond A. Nelli
Attorney, Agent, or Firm—Becker & Becker

[57] ABSTRACT

A spark-ignition, air-compressing, internal combustion engine having a combustion chamber in the shape of a body of revolution with a constricted opening in the piston crown. The injection nozzle is located in the cylinder head near the edge of the combustion chamber and the spark plug, opposite the injection nozzle, extends into the combustion chamber at the top dead center position of the piston. Mixture formation is predominantly by deposition of the fuel on the combustion chamber wall. In such an internal combustion engine, it is desired in applying the concept to a supercharged engine to satisfy the enhanced requirements with respect to mixture formation reliably in all ranges of operation, whereby a further improvement of ignition stability is also to be provided. This is essentially achieved by the special shape and proportioning of the combustion chamber, and in particular by the use of two arcs to form the side wall thereof, and a third arc, which joins the side wall, to form the bottom.

3 Claims, 1 Drawing Sheet

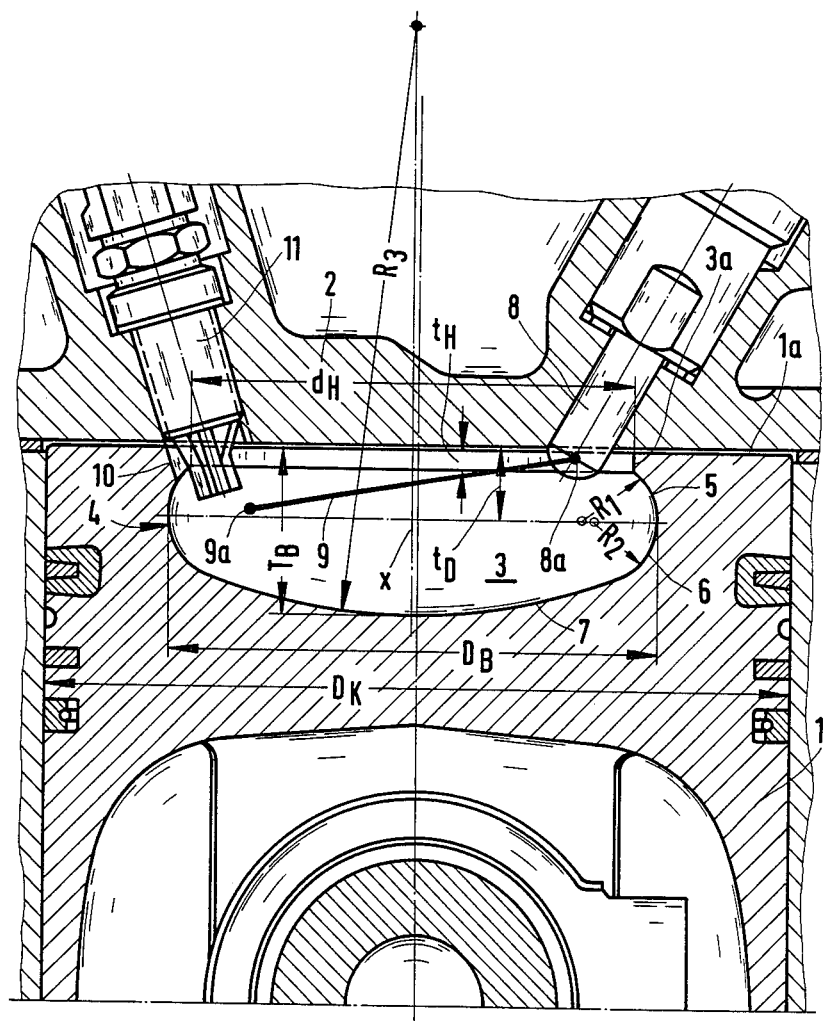

SPARK-IGNITION, AIR-COMPRESSING, INTERNAL COMBUSTION ENGINE

BACKGROUND OF THE INVENTION

The present invention relates to a spark-ignition, air-compressing, internal combustion engine that has direct injection of a major portion of the fuel by means of a jet onto the wall of the combustion chamber provided, in the shape of a body of revolution, in the piston, whereby such a rotary motion is imparted by means known per se to the inflowing air in the direction of the injected fuel jet so as to cause the fuel to be removed gradually in the vapor state from the wall of the combustion chamber and to be mixed with the air. The injection nozzle is located in the cylinder head near the combustion chamber rim, and the spark plug, which is arranged opposite (in plan) the injection nozzle, extends into the combustion chamber at the top dead center position of the piston. The side wall of the combustion chamber—viewed in cross section—is formed by two arcs that blend into each other and have radii of curvature $R_1$, $R_2$, the first arc with the radius $R_1$ extending from a restricted combustion chamber opening down to the maximum combustion chamber diameter $D_B$, and the second arc with the radius $R_2$ extending down to the bottom of the combustion chamber and/or blending into the latter, where the maximum combustion chamber diameter $D_B$ amounts to 0.5 to 0.7 times the piston diameter $D_K$ and is located at a defined depth $t_D$ from the piston crown relative to the combustion chamber depth $T_B$, the ratio of the combustion chamber opening diameter $d_H$ to the maximum combustion chamber diameter $D_B$ lying between 0.85 to 0.95, and the throat depth $t_H$ of the combustion chamber opening being between 0.1 and 0.15 $T_B$.

An internal combustion engine of this general type was disclosed by DE-PS No. 32 45 780.

One of the main problems in an internal combustion engine of the stratified-charge, spark-ignition type is in ensuring ignition of the air/fuel mixture under all possible operating conditions, be it cold starting, idling, or rated output. This means that the mixture composition present in the space of only a few cubic millimeters between the spark plug electrodes, which are covered by the ignition spark, has to remain sufficiently long within the ignition limits during the sparkover in order to produce a sufficiently large flame for the continued burning of the cylinder charge. Since the air velocity in the combustion chamber, and the injected fuel quantity, vary within wide limits, this problem can be solved only by careful matching-up of quite a number of parameters, such as the shape and relative positions of the combustion chamber, fuel jet, and spark plug electrodes, as well as the intensity of the air swirl and the phase positions of the injection and ignition cycles. In matching up each of these parameters, consideration has to be given to the specific fuel consumption, exhaust gas emissions, and component stress levels.

In the prior art (DE-PS No. 32 45 780), this philosophy applied to a naturally aspirated engine. In applying the concept from the naturally aspirated engine to a more powerful supercharged engine, the degree of difficulty of the previously described optimizing process increases because, in this case, both the injected fuel amount and the air charge involved in the process undergo more pronounced changes than in a naturally aspirated unit (between lower idle and rated output there are larger differentials of injection fuel amounts and air velocities). It was found that the shape of the combustion chamber in the piston crown is of great importance in applying this concept.

DE-PS No. 32 45 780 described the adoption of a shallower shape instead of a spheroidal shape for the combustion chamber. The reasons for this were:

(a) To reduce air squish or compression with a view to improving ignition stability and thermal relief of the combustion chamber throat.

(b) Use of as short an electrode as possible in view of the otherwise existing risk of breakage and deformation, and to reduce burnup which is a function of thermal conditions.

Applied to the supercharged internal combustion engine, the combustion chamber shape and fuel jet orientation of the prior art results in too lean a mixture quality at high speed and low engine loads. One possibility of overcoming this problem would be to locate the point where the fuel jet impinges on the wall closer to the spark plug. This would take care of difficulties at part load, but difficulties in the higher load range which really are substantial would be further increased in view of the greater amount of fuel supplied (rich mixture). It appears preferable, therefore, to overcome the difficulties at part load by increasing the curvature of the combustion chamber wall, with the orientation of the fuel jet unchanged and, in this manner, obtaining a richer mixture near the spark plug. The very pronounced curvature of the combustion chamber wall required for this would result in a large and shallow combustion chamber which is unfavorable for the mixture formation and combustion processes (bearing in mind that the combustion chamber volume should remain the same). The large combustion chamber diameter that results would considerably reduce the intensity of the air swirl which is necessary. Moreover, an excessive fuel film thickness would result at higher engine loads which, as a matter of experience, tends to produce drawbacks through sluggish combustion (too rich a mixture in the higher load range).

It is an object of the present invention, in an internal combustion engine of the initially described general type, to satisfy the enhanced mixture formation requirements in applying the concept to a supercharged engine in all operating ranges, i.e. to avoid too lean or too rich an air/fuel mixture being formed, whereby the above-mentioned advantages (a) and (b) are to be further improved and reliable ignition and optimum combustion of the mixture formed are ensured under all conditions.

BRIEF DESCRIPTION OF THE DRAWING

This object, and other objects and advantages of the present invention, will appear more clearly from the following specification in conjunction with the accompanying drawing, which is a longitudinal section through the upper parts of the piston and the cylinder head.

SUMMARY OF THE INVENTION

The internal combustion engine of the present invention is characterized primarily in that a third arc with a radius $R_3$ joins the second arc with the radius $R_2$ and forms the bottom of the combustion chamber, in that the maximum combustion chamber diameter is at a depth $t_D$ between 0.42 and 0.70 the depth $T_B$ of the combustion chamber, and in that defined relationships are provided between the radii $R_1$, $R_2$ and $R_3$ and the depth $T_B$ of the combustion chamber in a manner that the radius $R_1$ has a length of 0.35 to 1.20 $T_B$, the radius $R_2$ has a length of 0.10 to 0.40 $T_B$, and the radius $R_3$ has a length of 3.2 to 4.0 $T_B$.

Compared to the state of the art (where the combustion chamber shape is made up of two circular arcs and a straight bottom section), the inventive combustion chamber is now bowl-shaped with a cross section formed as a compound curve made up of three arcs of different radii blending into each other. Too pronounced a curvature of the bottom section or, respectively, too pronounced a wall curvature to the bottom of the combustion chamber, is here prevented by the 2nd arc with the radius $R_2$.

Overall, this results in a more pronounced curvature of the combustion chamber wall area which is important for the mixture formation (the equator region of the combustion chamber), but avoids the abovementioned disadvantages of too pronounced a curvature of the combustion chamber wall or bottom (where the arc with the radius $R_3$ directly blends into the arc with the radius $R_1$). This is because the reduced curvature of the wall below the combustion chamber equator makes it easier for the fuel to spread so that too rich a mixture cannot occur at the electrodes at full load. Moreover, the circular arc shape of the bottom (depression) of the combustion chamber prevents disturbances of the air flow, i.e. air swirl conditions remain the same. The volume of the combustion chamber also remains unchanged.

It has been shown that the shape of the combustion chamber according to the invention produces such an improvement of the mixture formation process that it even becomes possible to install the ignition device not only perpendicular to the piston crown (i.e. parallel to the cylinder axis), but also slanted to the outside. The inclined position of the spark plug eliminates the need to have the spark plug access opening penetrate through the valve hood, whereby improved functionalism of the cylinder head design is obtained. On the other hand, the inclined configuration calls for a larger entrant recess in the upper wall of the combustion chamber and, as a consequence, affects stability of combustion. But the improved mixture distribution overcompensates the adverse effect of the recess in the piston, necessary due to the inclined position of the spark plug, on the flow pattern near the spark plug.

The very high stability of ignition and combustion achieved reduces the need to equip the spark plug, for instance, with rod or hook-type electrodes which are parallel to each other over a length of several millimeters in order to enable the electric spark to follow cyclic variations with respect to the special mixture formation. This means that greater freedom is obtained in selecting the electrode shape. Since the life (long-time durability) of the ignition source is a specific problem, especially in high-compression spark-ignition engines, advantage is taken of the abovementioned fact to use ignition sources where lower temperatures and, as a result, reduced rates of burnup, occur at the electrode surfaces. This is achieved, for instance, by means of a spark plug having no projecting electrodes. Although the supply of the electrodes with an ignitable mixture is more difficult for such spark plugs than for spark plugs having projecting hook or rod electrodes since there is no flow induced by the movement of the charge in the combustion chamber between the electrodes, the slanted arrangement of the spark plug is a definite asset here because the end of the spark plug with the electrodes faces the fuel jet and ignition is achieved here by the relatively small amount of fuel which is directly distributed in the air.

DESCRIPTION OF PREFERRED EMBODIMENTS

Referring now to the drawing in detail, a combustion chamber 3 having a constricted opening 3a is arranged centrally, or almost centrally, in the crown 1a of a piston 1. The liquid fuel is injected from an injection nozzle 8, which is not shown is detail and which is arranged off-center in the cylinder head 2, with a timing suited to the type of operating conditions and the type of fuel (boiling point and ignition quality), with only one stream or jet 9 into the combustion chamber 3 in the direction of the rotating air for combustion. The point where the fuel jet impinges on the combustion chamber wall 4 is denoted 9a and is in the region of the maximum combustion chamber diameter $D_B$ (in the top dead center of the piston). The jet emission or discharge point 8a of the injection nozzle 8 is located near the edge of the combustion chamber opening. Opposite the jet emission point 8a, an entrant recess 10 is formed in the piston crown 1a and, respectively, the combustion chamber wall 4; a spark plug 11, which is also arranged in the cylinder head 2, extends into the recess 10 at the top dead center position of the piston 1. The spark plug may, for instance—as shown in the figure—consists of several rod electrodes; alternatively, a spark plug with hook-type electrodes may be used. As shown in the figure, the spark plug 11 extends from the combustion chamber 3 obliquely outwards (referring to the top dead center position of the piston). This eliminates the need to have the spark plug access opening penetrate through the cylinder head valve hood (which would be necessary with a spark plug arranged perpendicular to the piston crown 1a). The oblique arrangement of the spark plug 11 is made possible by the improvement obtained in mixture formation.

The side wall and, respectively, the bottom of the combustion chamber 3 are formed by three arcs 5, 6, 7 that blend into each other, the first arc 5 extending, with the radius $R_1$, from the constricted combustion chamber opening 3a to the maximum combustion chamber diameter $D_B$, and the second arc 6 extending, with the radius $R_2$, from there and blending into the bottom 7 of the combustion chamber. The combustion chamber bottom in turn represents the third arc 7 with the radius $R_3$. The maximum combustion chamber diameter $D_B$, on whose horizontal plane also lie the centers of the arcs 5, 6, is 0.5 to 0.7 times the piston diameter $D_K$ and, measured from the piston crown 1a, is at a depth $t_D$ which is equivalent to 0.42 to 0.70 times the depth $T_B$ of the combustion chamber. The arc radius $R_1$ of the side wall 4 of the combustion chamber has a length of 0.35 to 1.20 $T_B$, and the arc radius $R_2$ has a length of 0.10 to 0.40 $T_B$. The radius $R_3$ of the arc 7 (whose center is on the longitudinal axis x of the combustion chamber) is between 3.2 and 4.0 $T_B$. Finally, the diameter $d_H$ of the constricted combustion chamber opening 3a is between 0.85 and 0.95 $D_B$, the throat depth $t_H$ of this opening being between 0.1 and 0.15 $T_B$.

The fuel jet orientation and the correlation of the fuel jet impingement point 9a on the combustion chamber wall relative to the spark plug 11 agree with those of the internal combustion engine of the generic type referred to above.

Concluding, it should be mentioned that—thanks to the improvement in ignition and combustion obtained with the features according to the invention—a spark plug without projecting rod or hood electrodes may be used. Such a spark plug will further reduce the burnup rate of the electrodes.

The present invention is, of course, in no way restricted to the specific disclosure of the specification and drawing, but also encompasses any modifications within the scope of the appended claims.

What we claim is:

1. In a spark-ignition, air-compressing, internal combustion engine that has direct ignition of a major portion of the fuel by means of a jet onto the wall of the combustion chamber that is provided, in the shape of a body of revolution, in the piston, whereby rotary motion is imparted by means known per se to the inflowing air in the direction of the injected fuel jet so as to cause the fuel to be removed gradually in the vapor state from the wall of the combustion chamber and to be mixed with the air, the injection nozzle being located in the cylinder head near the combustion chamber rim, with the spark plug, which is disposed opposite the injection nozzle, extending into the combustion chamber in the top dead center position of the piston, with the side wall of the combustion chamber, when viewed in cross section, being formed by two arcs that blend into each other and have respective radii of curvature $R_1$, $R_2$, the first arc having a radius $R_1$ that extends from a restricted combustion chamber opening down to the maximum combustion chamber diameter $D_B$, and the second arc having a radius $R_2$ that extends down to the bottom of the combustion chamber and blends into the latter, said maximum combustion chamber diameter $D_B$ being 0.5 to 0.7 times the diameter $D_K$ of the piston and being at a defined depth $t_D$ from the piston crown relative to the depth $T_B$ of the combustion chamber, the ratio of the diameter $d_H$ of said combustion chamber opening to said maximum combustion chamber diameter $D_B$ lying between 0.85 to 0.95, and the throat depth $t_H$ of said combustion chamber opening being between 0.1 and 0.15 $T_B$, the improvement wherein:

said bottom of said combustion chamber is formed by a third arc, having a radius $R_3$, that joins said second arc with the radius $R_2$, with said maximum combustion chamber diameter $D_B$ being at a depth $t_D$ between 0.42 and 0.70 the depth $T_B$ of said combustion chamber, and with the relationships between said radii $R_1$, $R_2$ and $R_3$ and said depth $T_B$ of said combustion chamber being such that said radius $R_1$ has a length of 0.35 to 1.20 $T_B$, said radius $R_2$ has a length of 0.10 to 0.40 $T_B$, and said radius $R_3$ has a length of 3.2 to 4.0 $T_B$.

2. An internal combustion engine according to claim 1, in which said spark plug extends outwardly from said combustion chamber at an angle to a central longitudinal axis of the cylinder.

3. An internal combustion engine according to claim 1, in which said spark plug has no projection rod or hood electrodes.

* * * * *